(12) United States Patent
Finck et al.

(10) Patent No.: US 10,048,361 B2
(45) Date of Patent: Aug. 14, 2018

(54) ACOUSTIC WINDOW

(71) Applicant: Rohr, Inc., Chula Vista, CA (US)

(72) Inventors: Darren Gregory Finck, Jacksonville, FL (US); Joshua Hernandez, Ponte Vedra, FL (US)

(73) Assignee: ROHR, INC, Chula Vista, CA (US)

( * ) Notice: Subject to any disclaimer, the term of this patent is extended or adjusted under 35 U.S.C. 154(b) by 409 days.

(21) Appl. No.: 14/802,266

(22) Filed: Jul. 17, 2015

(65) Prior Publication Data

US 2017/0016982 A1 Jan. 19, 2017

(51) Int. Cl.
*G01S 7/521* (2006.01)
*G01S 15/02* (2006.01)

(52) U.S. Cl.
CPC .................. *G01S 7/521* (2013.01)

(58) Field of Classification Search
CPC ......... A01K 93/02; H04L 67/12; H04W 4/00; G01S 7/521; G01S 15/02; G10K 11/004; G10K 11/006
See application file for complete search history.

(56) References Cited

U.S. PATENT DOCUMENTS

| 3,033,551 | A | | 6/1962 | McCoy et al. |
| 3,038,551 | A | * | 6/1962 | McCoy ................ G10K 11/004 181/198 |
| 3,136,380 | A | | 6/1964 | Greenberg et al. |
| 3,372,662 | A | | 3/1968 | Nisewanger |
| 3,764,432 | A | * | 10/1973 | Bealor, Jr. ......... B29D 11/0074 156/242 |
| 4,731,763 | A | | 3/1988 | Wagner |
| 4,997,705 | A | | 3/1991 | Caprette, Jr. et al. |
| 6,831,876 | B1 | | 12/2004 | Cartwright |
| 2017/0016982 | A1 | * | 1/2017 | Finck ..................... G01S 7/521 |

FOREIGN PATENT DOCUMENTS

| CA | 2017976 C | | 10/2001 |
| GB | 2541531 A | * | 2/2017 |

OTHER PUBLICATIONS

GB Search Report for Application No. GB1612333.3 dated Dec. 16, 2016; 4 Pages.

* cited by examiner

*Primary Examiner* — Daniel Pihulic
(74) *Attorney, Agent, or Firm* — Cantor Colburn LLP

(57) ABSTRACT

An acoustic window for passage of desired acoustic waveforms therethrough is provided. The acoustic window includes at least a pair of structural septa. At least one core layer is sandwiched between the septa and includes a cellular reinforcement and transmission medium encapsulating the cellular reinforcement. The acoustic window may be included on the hull of a surface or submergible vessel, in order to provide a hydrodynamic fairing over sonar or other acoustic equipment.

15 Claims, 3 Drawing Sheets

ACOUSTIC WINDOW

BACKGROUND

Sonar systems have been widely used on marine vessels—e.g., surface ships, submarines, and torpedoes—for various underwater purposes, such as defining distances between objects, ocean floor mapping, and making other observations. In such systems, sonar equipment—like a sonar transducer or other form of hydrophone—can be embodied in or mounted on a hull of such a vessel. A streamlined housing referred to as an "acoustic window" or "sonar dome" encloses the equipment and protects or shields it from a body of free or open water surrounding it—such as an ocean, a lake, or water in a tank. The window is typically convex with respect to the body of water and embodied in the vessel to form a part of an exterior surface of the vessel and be contiguous and continuous with other parts of the vessel exterior surface surrounding the window. In this way, the vessel exterior surface is smooth and the acoustic window does not appreciably increase the drag.

An exterior surface of the window is in contact with the open water, and the interior surface is also in contact with water that is in a flooded chamber surrounding the sonar equipment. The window acts as a hydrodynamic fairing over the equipment and has water pressure on each side of the window. The window shields the sonar equipment from the moving water on the exterior of the vessel, this helps avoid noise interference that would be generated from the flow and/or cavitation of the flowing water around the equipment, and helps avoid vibration of the equipment as the water pushes loads into it. Typically the water pressure and force on each side of the window is equal and in balance, except for the hydrodynamic forces created by water movement due to vessel maneuvering. One requirement of the acoustic window is that it must withstand these hydrodynamic forces without significant deformation.

Desired acoustic-waveform energy (or sound-wave energy) is usually sent as signals from a transmitter located within the housing defined by the window, passed through the window to an object located without the housing, and reflected back from the object through the window to a receiver also located within the housing. As such, the signals propagate through the window in both directions. Another requirement of the acoustic window is that it should be sufficiently "transparent" to these acoustic signals, meaning it should transmit the targeted frequencies at the necessary range of incidence angles with minimal/acceptable signal distortion or attenuation.

It can be difficult to optimize both these structural and acoustic requirements in the same acoustic window design, and often there must be a trade-off of one against the other.

The acoustic window has traditionally been constructed as a single rigid sheet of high-strength materials—e.g., metal (such as steel) and/or fiber-reinforced plastics. However, the rigid window can generate and transmit a significant amount of acoustic noise associated with flow of water over the window and arising from vibrational frequencies related to operation of machinery aboard the vessel in which the window is embodied. The rigid window can also affect or generate a significant reflection of the signals impinging upon the exterior and/or interior surfaces of the window. Such reflection can result in a substantial reduction in the intensity of the signals being transmitted through the window. And, when such reflection occurs from the interior surface of the window during attempted transmission of the signals from within the chamber, spurious or erroneous determinations and/or echoes can result.

Other acoustic window designs have been utilized which improved upon the basic single rigid sheet configuration. For example, U.S. Pat. Nos. 4,997,705 and 6,831,876 each disclose a window made from a sandwich structure including a core layer sandwiched between and bonded to two septa (skin) layers. The material for and thickness of each of the core and septa layers are selected such that the window meets the structural and acoustic functional requirements. For instance, the septa have been made from materials such as fiber-reinforced polymers and metals. The core has been composed of low-shear/high-elongation-to-break materials, such as natural and synthetic rubbers, elastomers, and castable filled and unfilled synthetic polymers. These designs have been able to meet the structural and acoustic requirements of many applications.

However, these acoustic window designs are subject to limitations and have not been found totally satisfactory for all possible applications. More specifically, in "lower frequency" applications (up to about 40 kHz), an optimal design can be found in which the core and septa layers are relatively thick, which is typically sufficient for structural needs. In "medium frequency" applications (about 40-100 kHz), the core and septa of designs that are acoustically optimal (or even just acceptable) tend to be fairly thin. This results in difficulty balancing acoustic and structural needs. In "high frequency" applications (over 100 kHz), even modest structural requirements can become difficult or impossible to meet with acceptable acoustic performance.

Sophisticated instruments have been developed that are configured to use efficiently transmitted signals of high frequency (over 100 kHz) to increase definition and accuracy. Thus, there is a need for an acoustic window that meets high frequency acoustic requirements and the typical structural requirements.

SUMMARY

According to one embodiment, an acoustic window for passage of desired acoustic waveforms therethrough is disclosed. The window includes at least a pair of structural septa and at least one core layer sandwiched between the septa and including a cellular reinforcement and transmission medium encapsulating the cellular reinforcement.

Also disclosed is a method of manufacturing a core of an acoustic window for passage of desired acoustic waveforms therethrough. The method includes: providing at least one cellular reinforcement atop a surface of a structure; filling the cellular reinforcement with a transmission medium; placing a plate atop the cellular reinforcement and transmission medium to form a core layer, the plate including an array of holes formed therein; drawing, in a vacuum chamber, entrapped air from the transmission medium before the transmission medium cures; and laminating the core layer between two septa.

BRIEF DESCRIPTION OF DRAWING

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION

The figures show a non-limiting exemplary embodiment of an acoustic window for passage of desired acoustic waveforms therethrough according to the invention, generally indicated at 10. The window 10 can be associated with submerged liquid service (such as underwater oceanic service) in both military and commercial arenas. The window 10 is designed to meet structural requirements and acoustic requirements, including high frequency requirements. It should be readily appreciated by those having ordinary skill in the related art that the window 10 can be associated with any suitable type of service in any suitable arena. It should be so appreciated also that the liquid can be any suitable type of liquid. It should be so appreciated also that the window 10 can be for passage through the window 10 of any suitable acoustic waveform.

Figure 1:
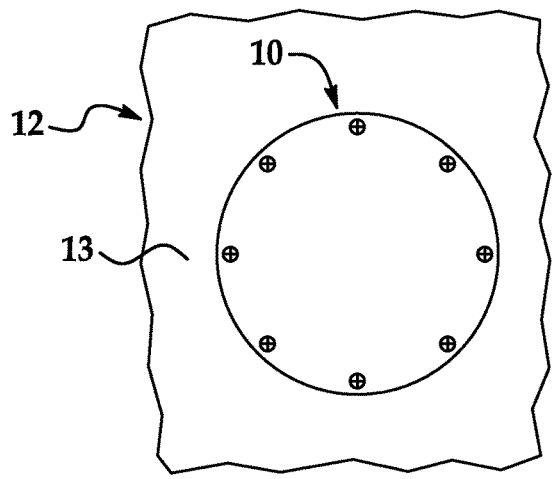
FIG. 1 is an environmental view showing a non-limiting exemplary embodiment of an acoustic window for passage of desired acoustic waveforms therethrough conformed to the exterior surface of a hull of a vessel on which the acoustic window is mounted.

For example and referring to FIG. 1, the window 10 can be for use on a surface or submergible vessel—such as a ship, buoy, submarine, torpedo, etc. For example, the window 10 can be an entirety or a portion of a sonar dome of a ship or submarine. The window 10 is configured to enclose sonar equipment (not shown) and separate it from a body of open liquid—like water (more particularly, fresh water or seawater)—surrounding the equipment. Sound signals are configured to be transmitted/received through the water and window 10. The window 10 can have any suitable or conventional hydrodynamic form or shape, such as, but not limited to, generally ellipsoidal, hyperbolic, circular, and the like. The window 10 can also be conformed as a curvilinear portion of an external surface of the vessel on which the window 10 is appropriately mounted such that the window 10 forms a smooth surface with a remainder of an exterior 13 of the hull 12. In this way, the window 10 forms a hydrodynamic fairing over the equipment to protect it and also provides quieter traveling of the vessel through the water.

A particular physical form taken by the window 10 in part will be a function of a particular signal transmission/reception function to be provided by the sonar equipment positioned behind the window 10 or within an enclosure at least partially defined interiorly of the window 10. The window 10 can be also designed for a range of angles of the signals incident upon the window 10 and acoustic tuning in a range of frequencies of the signals.

Figure 2:
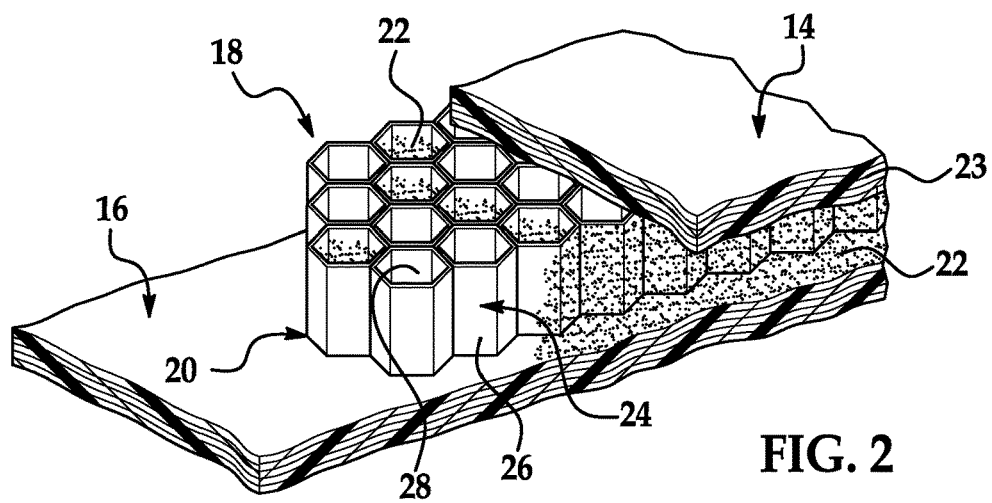
FIG. 2 is a perspective view, partly in section, of a portion of the acoustic window illustrated in FIG. 1.
Figure 3:
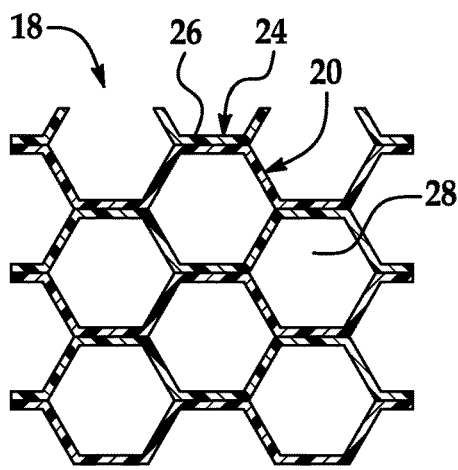
FIG. 3 is a sectional view of a non-limiting exemplary embodiment of the cellular reinforcement of the core of the acoustic window illustrated in FIG. 2.
Figure 4:
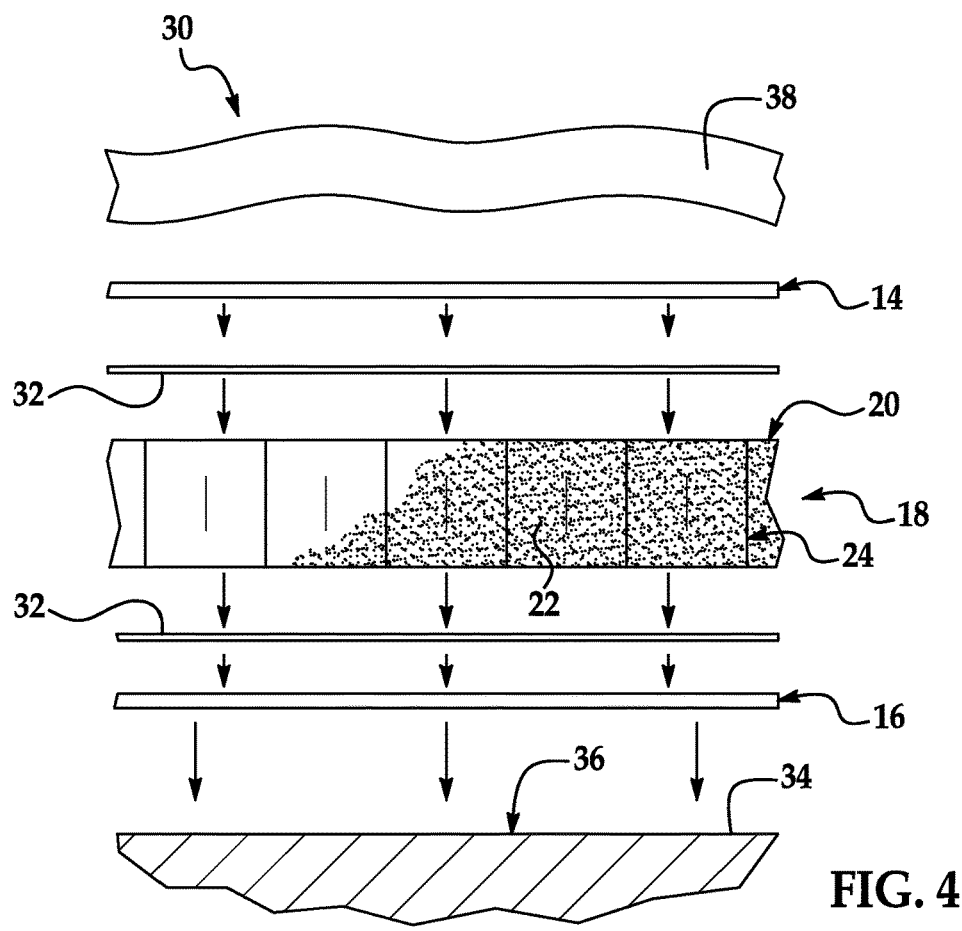
FIG. 4 is a schematic exploded view showing a lay-up of workpieces and consumables of a fabrication method for the acoustic window illustrated in FIG. 2.

Referring to FIGS. 2-4, the window 10 includes at least a pair of structural septa, generally indicated at 14, 16. At least one core layer, generally indicated at 18, is sandwiched between the septa 14, 16 and comprises a cellular reinforcement 20 and transmission medium, generally indicated at 22, encapsulating the cellular reinforcement 20.

As viewed in FIGS. 2 and 4, the septa 14, 16 include top and bottom septa 14, 16. The core layer 18 is disposed in contacting relationship with and substantially parallel with the septa 14, 16. In an embodiment, the core layer 18 is laminately sandwiched between the septa 14, 16.

The acoustic and structural requirements for a particular application of the window 10 may be achieved by adjusting the thickness of each of the septa 14, 16 and the core layer 18, and by selecting materials with appropriate properties. For instance, the magnitude of signal attenuation is influenced by the density and thickness of the septa 14, 16 and the core layer 18, and a number of other properties. The load carrying ability of the window 10 is also influenced by the same and other properties, such as the modulus of elasticity. Thus, the materials used for window 10, and the dimensions will may be selected by those of ordinary skill in this art to suit a particular application. Each of the septa 14, 16, transmission medium 22, and cellular reinforcement 20 will now be discussed in detail in turn.

Septa

The septa 14, 16 are disposed spaced from and substantially parallel with each other. As illustrated in FIG. 2, each septum 14, 16 may include a plurality of plies 23 as an artifact of the manufacturing process selected. In other embodiments, each septum may be a more homogenous structure such as a sheet of metal. External surfaces of the septa 14, 16 not in contact with (i.e., obverse to) the cellular reinforcement 20 may be covered with a coating (not shown) of a synthetic or natural rubber or other elastomer. The coating may vary in thickness from between about $\frac{1}{16}$ in. (0.16 cm) to about 1 in. (2.54 cm). The coatings are applied to the respective septum 14, 16 employing adhesive, vulcanizing (or other cross-linking), or other suitable or conventional techniques known in the related art.

As previously mentioned, the material selection for the septa 14, 16 will depend upon the particular application of the window 10, and the structural and acoustic performance requirements. In general, the material used for septa 14, 16 will be a higher modulus, or stiffer, material than that selected for the transmission medium 22.

More specifically, the septa 14, 16 can be formed of suitable or conventional structural materials. In an embodiment, the septa 14, 16 are constructed of metal or alloys thereof, such as steel, stainless steel, aluminum, or titanium. In another embodiment, the septa 14, 16 are constructed of at least one plastic. This plastic material can be, for example, reinforced or unreinforced thermosetting plastic or reinforced or unreinforced thermoplastic. Fiber-reinforced plastics may be used and may be reinforced with carbon or glass fibers, or other conventional fibers, as an example. Fiber-reinforced plastic septa may be constructed using conventional techniques including prepreg layups, which would result in the septa having several laminate plies as illustrated in FIG. 2.

Transmission Medium

The transmission medium 22 is configured to fully encapsulate the cellular reinforcement 20 (although in FIG. 2, for ease of illustration only, the transmission medium 22 is shown encapsulating only a portion of the cellular reinforcement 20). In an embodiment, the transmission medium 22 is a filler of elastomeric material 22. More specifically, the elastomeric filler 22 is selected from a group consisting of urethane, natural and synthetic rubbers, and filled and unfilled synthetic polymers. In an aspect, the elastomeric-material filler 22 is urethane.

"Elastomer" is a material possessed of an ability to recover at least in part a former figure or shape upon removal of a figure- or shape-distorting force, and "rubber" is a vulcanized or cross-linked rubber made according to suitable or conventional techniques.

Suitable synthetic rubbers include styrene-butadiene and acrylonitrile-based rubbers (commonly known in the industry as "nitrile rubbers"). Chlorinated rubbers can find utility in forming the elastomeric-material filler 22. Suitable castable filled or unfilled synthetic polymers include polyurethanes and so-called "reactive liquid polymers." Other elastomers having possible utility as the elastomeric-material filler 22 include polyurethanes, polybutadienes and acrylic-copolymeric rubbers, and ethylene-propylene-based polymers (EPDMS).

The transmission medium 22 may achieve more desirable properties relevant to the acoustic and structural requirements, through the optional use of reinforcements or fillers. Suitable reinforcements, such as chopped glass or carbon fibers, may be selected to suit a particular need or application by those of ordinary skill in this art.

Cellular Reinforcement

The cellular reinforcement 20 defines a multi cell-shaped web structure. In this way, the cellular reinforcement 20 defines a plurality of cells 24 contiguous or interconnected and parallel with each other. In an embodiment, each cell 24 is substantially tubular and includes at least one wall 26 and a hole 28 defined by an interior of the cell 24. Each wall 26 and a longitudinal axis of the cell 24 are disposed substantially normal to the septa 14, 16.

In the example shown in FIGS. 2 and 3, the cells 24 of the cellular reinforcement 20 are represented by a plurality of contiguous or interconnected honeycombs (i.e., each cell 24 defining a hexagonal transverse cross-section). However, it should be readily appreciated that a transverse cross-section of the cells 24 can be circular, elliptical, octagonal, rectangular, triangular, etc. (or any combination of these shapes). As such, each cell 24 can define a single arcuate wall 26 or a plurality of linear walls 26.

The encapsulation of the cellular reinforcement 20 by the elastomeric-material filler 22 includes filling of the hole 28 of each cell 24 and any volume of the core 18 defined exterior the cellular reinforcement 20. As shown in FIG. 2, the elastomeric filler 22 occupies substantially an entirety of the core layer 18 such that no air bubbles or voids are present.

Thickness of the walls 26 of the cellular reinforcement 20 can be adjusted as desired to impact the structural properties of the window 10.

In an embodiment, the cellular reinforcement 20 is composed of at least one metal or plastic material. The cellular reinforcement 20 may be selected from one of the several standard options commercially available, such as aluminum or Nomex honeycomb. Like the septa 14, 16, the cellular reinforcement 20 is generally made from a material with a higher modulus than the transmission medium 22.

Exemplary manufacturing processes details for the window 10 will now be described.

The septa 14, 16 may be laminated to the cellular reinforcement 20 and or transmission medium 22. Depending upon materials forming the septa 14, 16, the cellular reinforcement 20, and the transmission medium 22, such affixation can be accomplished employing adhesive or polymeric cross-linking techniques, such as vulcanization or other chemical cross-linking. For example, FIG. 4 shows a lay-up, generally indicated at 30, for such a lamination wherein a film of adhesive 32 is placed between the core layer 18 (including both the cellular reinforcement 20 and elastomeric-material filler 22) and top septum 14 and another adhesive film 32 is placed between the core layer 18 and bottom septum 16. With the films 32 in place, the septa 14, 16, core layer 18, and films 32 are placed on a surface 34 of a tool (illustrated as a flat surface for convenience only), generally indicated at 36. A vacuum bag and breather cloth may be placed over and around the septa 14, 16, core layer 18, films 32, and sealed to the tool surface 34. A vacuum pump (not shown) pulls a vacuum to draw together the septa 14, 16, core layer 18, and films 32. The entire assembly may be placed in an autoclave for additional application of pressure to force the preforms together and ensure adequate contact for bonding. The autoclave or heat blankets or other devices may provide heat, if necessary, to activate and/or cure the adhesive in films 32. In any event, a particular technique for forming a laminating bond between the septa 14, 16 and the core layer 18 is typically selected in view of a chemical nature of particular materials forming the septa 14, 16 and the core layer 18. It is desired that the septa 14, 16, the transmission medium 22, and the cellular reinforcement 20 be in laminate contact with each other for effective transmission of acoustic waves across their interfaces, and for effective transfer of shear and other loads in order to achieve the structural requirements.

Figure 6:
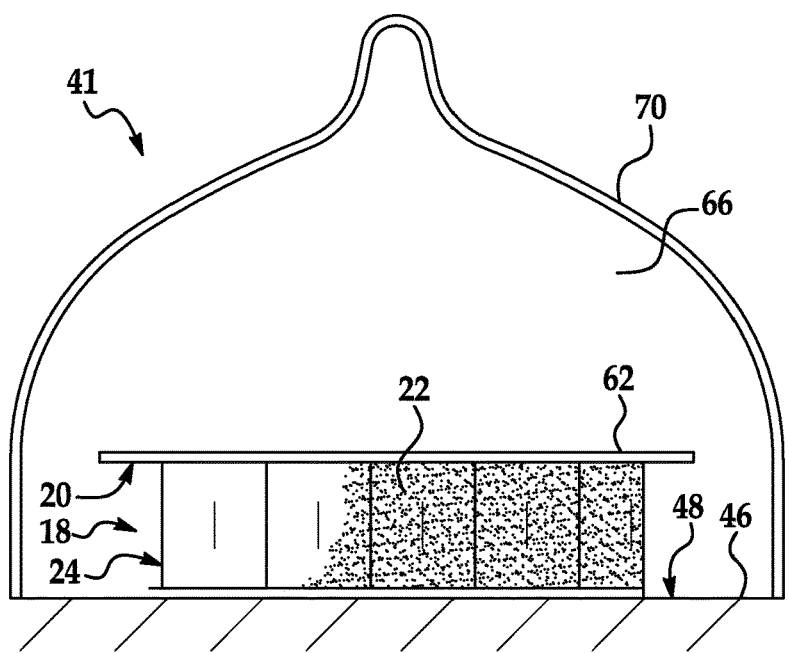
FIG. 6 is a schematic view showing a lay-up of workpieces for fabrication of the core according to the method charted in FIG. 5.
Figure 5:
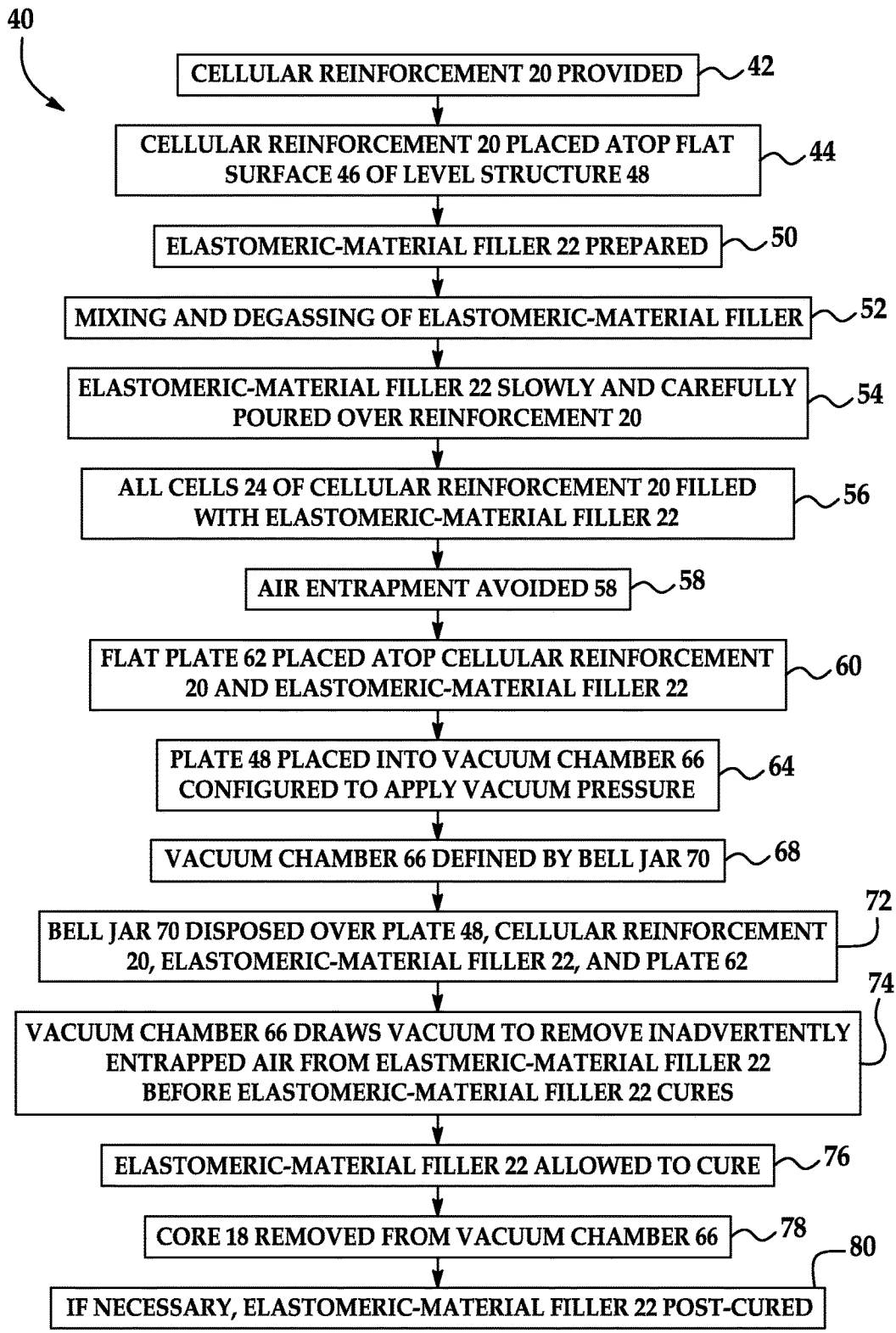
FIG. 5 is a flow chart showing steps involved in a non-limiting exemplary embodiment of a method for fabricating the core illustrated in FIG. 2.

Referring now to FIGS. 5 and 6, a non-limiting exemplary embodiment of a method, generally indicated at 40, for fabricating the core layer 18 of the window 10 will now be described. FIG. 6 shows a lay-up, generally indicated at 41, of workpieces for such fabrication.

At 42, the cellular reinforcement 20 is provided. At 44, the cellular reinforcement 20 is placed atop a surface 46 of a level structure, generally indicated at 48. At 50, the elastomeric filler 22 is prepared, which includes mixing and degassing 52 of the elastomeric filler 22. It should be appreciated that such preparation can be performed by conventional methods. At 54, the elastomeric filler 22 is poured over the cellular reinforcement 20 such that all of the cells 24 (including the respective holes 28) of the cellular reinforcement 20 are filled 56 with the elastomeric filler 22 and air entrapment (i.e., bubbles or other voids) is avoided 58. At 60, a plate 62 containing an array of small holes is placed atop the cellular reinforcement 20 and the elastomeric filler 22. At 64, the plate 48 (atop of which the cellular reinforcement 20, elastomeric-material filler 22, and plate 62 are placed) is placed into a vacuum chamber 66 that is configured to apply vacuum pressure. In an aspect, at 68, the vacuum chamber 66 is defined by a bell jar 70 (or other similar tool) such that, at 72, the bell jar 70 is disposed over the plate 48, cellular reinforcement 20, elastomeric-material filler 22, and plate 62. At 74, the vacuum chamber 66 draws or pulls a vacuum to remove any inadvertently entrapped air (i.e., bubbles or other voids) from the elastomeric-material filler 22 before the elastomeric-material filler 22 cures. At 76, the elastomeric-material filler 22 is allowed to cure. At 78, the core layer 18 is removed from the vacuum chamber 66. At 80, if necessary, the elastomeric-material filler 22 is post-cured and trimmed to a desired shape.

The cell-shaped web structure of the cellular reinforcement 20 provides a structural load path for loads, especially shear loads, between the septa 14, 16, while causing minimal degradation of the acoustic waveforms.

While the invention has been described in detail in connection with only a limited number of embodiments, it should be readily appreciated that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it is to be readily appreciated that aspects of the invention may include only some of the described embodiments. Accordingly, the invention is not to be seen as limited by the foregoing description, but is only limited by the scope of the appended claims.

We claim:

1. An acoustic window for passage of desired acoustic waveforms therethrough, the acoustic window comprising:
   at least a pair of structural septa; and
   at least one core layer sandwiched between the septa and including a cellular reinforcement and transmission medium encapsulating and within the cellular reinforcement.

2. The acoustic window of claim 1, wherein the cellular reinforcement defines a multi-cell-shaped web structure.

3. The acoustic window of claim 1, wherein the cellular reinforcement is of a metal or composite material.

4. The acoustic window of claim 1, wherein the transmission medium is a filler of elastomeric material.

5. The acoustic window of claim 4, wherein the elastomeric-material filler is selected from a group consisting of urethane, natural and synthetic rubbers, and filled and unfilled synthetic polymers.

6. The acoustic window of claim 1, wherein each of the septa is formed of at least one of metal, plastic, and carbon-fiber-composite material.

7. The acoustic window of claim 1, wherein the core layer is laminately sandwiched between the septa.

8. A method of manufacturing a core of an acoustic window for passage of desired acoustic waveforms therethrough, the method comprising:
   providing at least one cellular reinforcement atop a surface of a structure;
   filling the cellular reinforcement with a transmission medium;
   placing a plate atop the cellular reinforcement and transmission medium to form a core layer, the plate including an array of holes formed therein;
   drawing, in a vacuum chamber, entrapped air from the transmission medium before the transmission medium cures; and
   laminating the core layer between two septa.

9. The method of manufacturing the acoustic-window core of claim 8, further comprising: mixing and degassing of the transmission medium.

10. The method of manufacturing the acoustic-window core of claim 8, wherein the cellular reinforcement defines a multi-cell-shaped web structure.

11. The method of manufacturing the acoustic-window core of claim 10, wherein the filling includes pouring the transmission medium over the cellular reinforcement such that all of the cells of the cellular reinforcement.

12. The method of manufacturing the acoustic-window core of claim 8, wherein the vacuum chamber is defined by a bell jar disposed over the core.

13. The method of manufacturing the acoustic-window core of claim 8, further comprising:
   curing the transmission medium after drawing.

14. The method of manufacturing the acoustic-window core of claim 8, wherein the transmission medium is a filler of elastomeric material.

15. The method of manufacturing the acoustic-window core of claim 14, wherein the elastomeric-material filler is selected from a group consisting of urethane, natural and synthetic rubbers, and filled and unfilled synthetic polymers.

* * * * *